May 30, 1967 H. J. WALTER ETAL 3,322,964
SELECTABLE POWER SOURCE FOR LAMP
INCLUDING RECHARGEABLE BATTERY
Filed Sept. 29, 1964
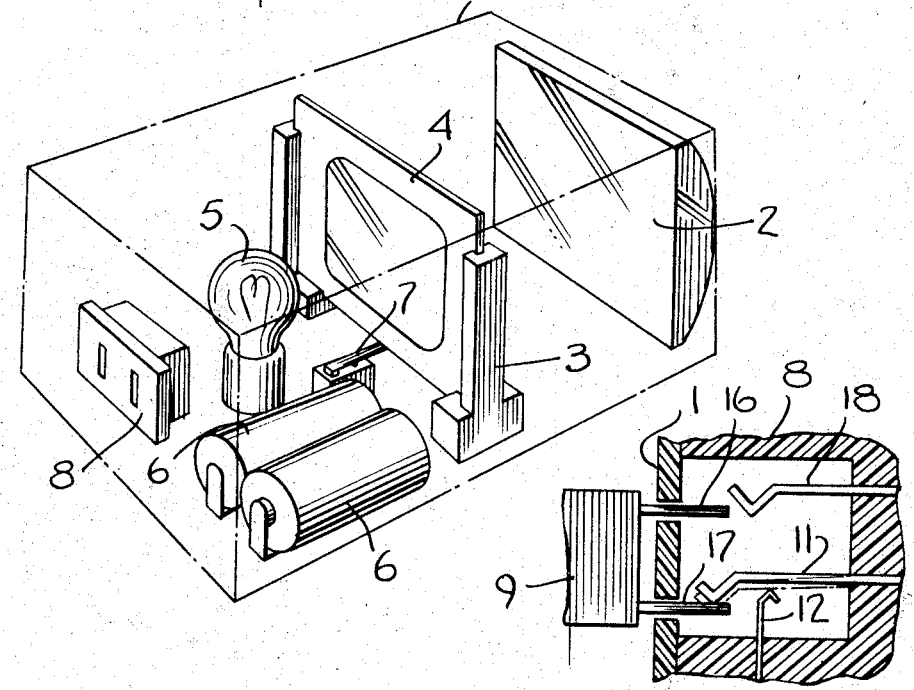
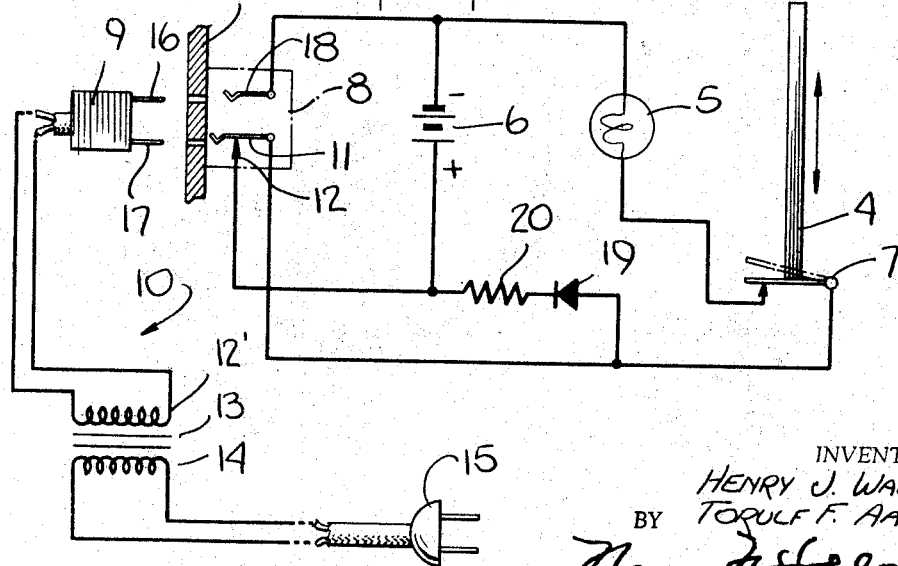
INVENTORS
HENRY J. WALTER
BY TORULF F. AASEN
ATTORNEY

United States Patent Office 3,322,964
Patented May 30, 1967

1

3,322,964
SELECTABLE POWER SOURCE FOR LAMP
INCLUDING RECHARGEABLE BATTERY
Henry J. Walter, Bethpage, and Torulf F. Aasen, Little
Neck, N.Y., assignors to Airequipt Inc., New Rochelle,
N.Y., a corporation of New York
Filed Sept. 29, 1964, Ser. No. 400,134
2 Claims. (Cl. 307—66)

This application relates to a battery powered viewing device and more particularly to such a device incorporating means for renewing the charge of the viewer battery.

Viewers for pictures such as colored transparencies are well-known where a battery powered lamp is used for illumination. Such viewers are provided in a variety of hand or table mounted designs and in some cases these viewers are provided with both batteries and with an optional power supply so that they may be operated from ordinary house current.

The present invention provides a viewer of this general type having both a battery power source and an optional transformer power source and incorporating a novel circuit for re-charging the batteries from the alternate transformer power supply. This improvement has been incorporated into the viewer in a novel circuit which requires the addition of only a very few elements and which is automatic in its operation so that the charging action is obtained whenever the viewer is used with a power outlet such as a regular household power supply outlet or wall plug.

Accordingly an object of the present invention is to provide an improved viewer of the type including battery powered illumination.

Another object of the present invention is to provide an improved battery operated viewing device containing an automatically operated battery re-charging circuit.

Other and further objects of the invention will be obvious upon an understanding of the illustrative embodiments about to be described or will be indicated in the appended claims, and various advantages not referred to herein will occur to one skilled in the art upon employment of the invention in practice.

A preferred embodiment of the invention has been chosen for puposes of illustration and description and is shown in the accompanying drawings, forming a part of the specification, wherein:

FIG. 1 is a perspective view illustrating the principal elements of the viewer arranged in a suitable case;

FIG. 2 is a schematic diagram of the preferred embodiment of the battery illumination circuit and the optional A.C. power and re-charging circuit; and FIG. 3 is an enlarged fragmentary view of a preferred embodiment of the plug-in means for the auxiliary transformer power source.

FIG. 1 illustrates the arrangement of a preferred embodiment of the viewer with a case 1 containing a viewing lens 2 spaced from a slide retaining frame 3 for receiving a transparent slide 4. A suitable illuminating lamp 5 is mounted on the opposite side of the slide 4 from the lens 2. Batteries 6 are provided as a power source for the lamp 5 and are coupled to the lamp upon the insertion of a slide into the frame 3 as the slide 4 closes the lamp switch 7. A convenient socket 8, which will be further described below, is provided on the case 1 to receive a plug 9 from an auxiliary transformer power source 10 (FIG. 2) which, as will also be described below, simultaneously operates the lamp 5 and re-charges the batteries 6.

FIG. 2 illustrates a preferred embodiment of the circuit for the above described viewer. With the slide 4 inserted and the switch 7 closed, the batteries 6 are coupled

2 to the lamp 5 through contacts 11 and 12 of socket 8. In this condition of the circuit, the viewer operates as a battery powered viewer with the lamp 5 being turned on and off by the insertion of slides 4 into the frame 3 thereby closing the switch 7 when the slides 4 are in their viewing position. When the batteries 6 have become discharged or when it is convenient to operate the viewer from a conventional voltage source such as from the normal 110 volt house lines, the power source 10 is coupled to the viewer by inserting its plug 9 into the viewer socket 8. The secondary 12' of the transformer 13 is arranged to provide a voltage about equal to that of the batteries for the particular lamp being used. The primary 14 of the transformer 13 is coupled to the A.C. source by a plug 15. When the plug 9 is connected to the viewer by insertion into the socket 8, its spaced prongs 16 and 17 engage the two socket 8 contacts 11 and 18. The third contact 12 in the socket 8 is disengaged from the lower contact 11 when the viewer plug 9 is inserted as illustrated in detail in FIG. 3. This causes the batteries 6 to be automatically disconnected from the lamp 5 while the transformer power source 10 is being used.

In order to cause the batteries 6 to be charged when the transformer 13 is coupled into the socket 8, the batteries 6 are connected to the transformer secondary 12' through a rectifier such as the diode rectifier 19 and a current limiting resistor 20.

A convenient lamp for use in viewer illumination is a 2.5 volt .5 ampere lantern lamp powered by two type-C drycells connected in series. For this arrangement, the transformer secondary will have about a 2.5 volt output and the current limiting resistor is about 25 ohms for a maximum re-charging current of .1 ampere when the voltage of the batteries has dropped substantially from its fully charged amount. The recharging current will taper off as the battery voltage approaches the voltage of the transformer secondary so that there is no danger of over charging even though the viewer is used for a substantial period with the transformer power source. Regular inexpensive drycells may be used in the viewer circuit such as are normally used in flashlights and these drycells may be re-charged many times by the above described re-charging circuit. Other types of batteries may also be used.

In order to prevent the operator of the viewer from receiving an unintentional shock when he plugs the transformer into the viewer and while he holds the plug 15 in his hand, the contacts 11 and 18 of the viewer socket 8 are preferably arranged as illustrated in FIG. 3. This arrangement causes the contacts 11 and 12 in the battery circuit to be opened prior to the completion of the transformer secondary circuit through the upper socket 8 contact 18. If both contacts 11 and 18 of the socket 8 are engaged simultaneously by contacts 16 and 17 of the plug 9 or make intermittent contact, there is a possibility that a pulse or pulses of current will pass through the transformer secondary 12' causing a high voltage pulse or pulses on the plug 15 causing discomfort to the viewer operator.

It will be seen that an improved slide viewer or similar device has been disclosed which provides for both battery and house current operation and which in addition has an automatic re-charging operation when the viewer is being operated by house current or at any other time when it is desirable to re-charge the battery of the viewer. The circuit which cooperates with the power source to provide this re-charging action is reliable and efficient and is readily incorporated into viewers without changes in their over-all shape and size. The re-charger circuit is also adapted in a novel manner to eliminate any possibility of shock resulting from unintentional mishandling by the viewer operator.

As indicated above the automatic re-charging circuit is particularly advantageous since it is useful with the regular inexpensive type of drycells, such as are widely used in flashlights and similar devices and which may be readily obtained from a wide number of sources. While batteries of this type have a fairly long life in regular service, the above described re-charging features gives such drycells a greatly extemded life which not only makes the use of a battery operated viewer less expensive but also makes the use more desirable to the operator since he feels free to make unlimited use of the battery operated device knowing that the batteries may be recharged whenever necessary by the simple expedient of inserting the two plugs of the auxiliary power source. The circuit incorporating the re-charging device also includes a slide actuated switch which in combination with the re-charging feature also acts to make the life of the viewer batteries extend so that the preferred viewer described comprises an extremely efficient illuminated viewing device.

As various changes may be made in the form, construction and arrangement of the parts herein without departing from the spirit and scope of the invention and without sacrificing any of its advantages it is to be understood that all matter herein is to be interpreted as illustrative and not in a limiting sense.

Having thus described our invention, we claim:

1. An illuminated slide viewer comprising the combination of a slide illuminating lamp, a voltage step down transformer having its secondary removably coupled across said lamp by a separable connector comprising a two contact plug and two cooperating socket terminals, a battery, a rectifier connected in series with said battery, said serially connected battery and rectifier being connected across said lamp, a switch means connected across said rectifier positioned to be opened by coupling movement of the transformer to the lamp through said connector and prior to engagement of said plug contacts with both of said socket terminals.

2. The slide viewer as claimed in claim 1 in which one contact on said plug and one terminal of said socket are proportioned to engage each other prior to the engagement of the second plug contact and the second socket terminal, said one socket terminal having a movable portion adapted for being moved upon engagement of said one socket terminal with said one plug contact, and said switch means comprising a third contact engaging the movable portion of said one socket terminal and being positioned for being disengaged therefrom when said one plug contact engages said one socket terminal.

References Cited
UNITED STATES PATENTS

| | | | |
|---|---|---|---|
| 1,418,398 | 6/1922 | Reid | 307—66 |
| 2,089,165 | 8/1937 | Oliver | 200—51.1 |

DAVID J. GALVIN, *Primary Examiner.*